UNITED STATES PATENT OFFICE.

WALTER S. ROCKEY AND HILLIARY ELDRIDGE, OF NEW YORK, N. Y.

PROCESS OF MANUFACTURING METALLIC MANGANESE AND ALUMINUM FLUORID.

988,509. Specification of Letters Patent. Patented Apr. 4, 1911.

No Drawing. Application filed September 26, 1910. Serial No. 583,897.

*To all whom it may concern:*

Be it known that we, WALTER S. ROCKEY and HILLIARY ELDRIDGE, citizens of the United States, both residing at New York city, in the county of New York and State of New York, have invented certain new and useful Improvements in Processes of Manufacturing Metallic Manganese and Aluminum Fluorid, of which the following is a full, clear, and exact specification.

Our invention relates to the process of manufacturing metallic manganese and aluminum fluorid, and the object of our invention is to provide a process of manufacturing the same.

We provide a suitable refractory crucible or tilting hearth composed of material neutral to the chemical action of the ingredients to be treated, which may be made of material such as magnesite. We then place in said crucible or tilting hearth a mixture of dry calcium fluorid to serve as a flux and dry manganese fluorid and metallic aluminum having an excess of calcium fluorid and manganese fluorid present, and heat the same until the aluminum reacts on the manganese fluorid which in so doing takes the fluorin away from the manganese fluorid thus forming aluminum fluorid and freeing metallic manganese, as per the following equation

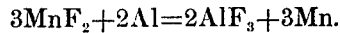

$$3MnF_2 + 2Al = 2AlF_3 + 3Mn.$$

The manganese is precipitated by gravity to the bottom of the crucible or hearth, the aluminum fluorid which is thus formed by this reaction mixes with the calcium fluorid of the mixture, the manganese can be poured out of the crucible into molds and the molten mixture of the fluorids being poured out at the same time will cover and protect the manganese from oxidation. After the metallic manganese and mixtures of fluorids have cooled in the mold, the fluorids can be removed and separated from the manganese by mechanical means.

Having thus described our invention what we claim as new is:—

1. The process of manufacturing metallic manganese and aluminum fluorid, which consists in placing together dry calcium fluorid to serve as a flux, dry manganese fluorid and metallic aluminum and fusing and heating same until the aluminum reacts on the manganese fluorid and forms aluminum fluorid and frees metallic manganese.

2. The process of manufacturing metallic manganese and aluminum fluorid, which consists in placing a mixture of dry calcium fluorid to serve as a flux, dry manganese fluorid and metallic aluminum, said calcium fluorid and manganese fluorid being in excess, into a suitable crucible or tilting hearth, and fusing and heating same until the aluminum reacts on the manganese fluorid and forms aluminum fluorid and frees metallic manganese.

3. The process of manufacturing metallic manganese and aluminum fluorid, which consists in placing a mixture of dry calcium fluorid to serve as a flux, dry manganese fluorid and metallic aluminum, said calcium fluorid and manganese fluorid being in excess, into a suitable crucible or tilting hearth, and fusing and heating same until the aluminum reacts on the manganese fluorid and forms aluminum fluorid and frees metallic manganese, then pouring said metallic manganese and said fluorids from said crucible and protecting said manganese beneath the surface of said fluorids during the said operation and then cooling said manganese beneath the surface of said fluorids.

4. The process of manufacturing metallic manganese and aluminum fluorid, which consists in placing together dry calcium fluorid to serve as a flux, dry manganese fluorid and metallic aluminum and fusing and heating same until the aluminum reacts on the manganese fluorid and forms aluminum fluorid and frees metallic manganese, and then cooling said manganese beneath the surface of said flux.

In testimony whereof, we affix our signatures, in presence of two witnesses.

WALTER S. ROCKEY.
HILLIARY ELDRIDGE.

Witnesses:
FRANK C. PLUME,
G. F. QUACKINBUSH.